United States Patent
Chamarty et al.

(10) Patent No.: US 10,884,959 B2
(45) Date of Patent: Jan. 5, 2021

(54) WAY PARTITIONING FOR A SYSTEM-LEVEL CACHE

(71) Applicant: Google LLC, Mountain View, CA (US)

(72) Inventors: Vinod Chamarty, Sunnyvale, CA (US); Xiaoyu Ma, Mountain View, CA (US); Hongil Yoon, San Jose, CA (US); Keith Robert Pflederer, Mountain View, CA (US); Weiping Liao, Fremont, CA (US); Benjamin Dodge, San Jose, CA (US); Albert Meixner, Mountain View, CA (US); Allan Douglas Knies, Burlingame, CA (US); Manu Gulati, Saratoga, CA (US); Rahul Jagdish Thakur, Santa CLara, CA (US); Jason Rupert Redgrave, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/518,503

(22) Filed: Jul. 22, 2019

(65) Prior Publication Data

US 2020/0257639 A1    Aug. 13, 2020

Related U.S. Application Data

(60) Provisional application No. 62/805,080, filed on Feb. 13, 2019.

(51) Int. Cl.
| | |
|---|---|
| *G06F 13/16* | (2006.01) |
| *G06F 12/0811* | (2016.01) |
| *G06F 12/0877* | (2016.01) |
| *G06F 12/0815* | (2016.01) |

(52) U.S. Cl.
CPC ...... *G06F 13/1694* (2013.01); *G06F 12/0811* (2013.01); *G06F 12/0815* (2013.01); *G06F 12/0877* (2013.01)

(58) Field of Classification Search
CPC ............. G06F 13/1694; G06F 12/0811; G06F 12/0877; G06F 12/0815; G06F 12/081; G06F 12/0848; G06F 12/084
USPC .......................... 711/129, 128, 130, 119, 103
See application file for complete search history.

(56) References Cited

U.S. PATENT DOCUMENTS

| | | | |
|---|---|---|---|
| 5,970,509 A | * | 10/1999 | Green ................... G06F 9/3812 711/128 |
| 9,529,719 B2 | | 12/2016 | Walker |
| 9,734,070 B2 | | 8/2017 | Artieri |

(Continued)

OTHER PUBLICATIONS

Qureshi et al., "Utility-based cache partitioning: A low-overhead, high-performance, runtime mechanism to partition shared caches," IEEE, Dec. 2006, 10 pages.

(Continued)

*Primary Examiner* — Hong C Kim
(74) *Attorney, Agent, or Firm* — Fish & Richardson P.C.

(57) ABSTRACT

Methods, systems, and apparatus, including computer programs encoded on computer storage media, for a system-level cache to allocate cache resources by a way-partitioning process. One of the methods includes maintaining a mapping between partitions and priority levels and allocating primary ways to respective enabled partitions in an order corresponding to the respective priority levels assigned to the enabled partitions.

24 Claims, 6 Drawing Sheets

(56) References Cited

U.S. PATENT DOCUMENTS

| | | | |
|---|---|---|---|
| 2006/0143390 A1* | 6/2006 | Kottapalli | G06F 12/126 |
| | | | 711/130 |
| 2006/0179230 A1* | 8/2006 | Fields, Jr. | G06F 12/126 |
| | | | 711/129 |
| 2015/0039833 A1 | 2/2015 | Chang et al. | |
| 2016/0019158 A1* | 1/2016 | Palacharla | G06F 9/50 |
| | | | 711/129 |
| 2017/0357596 A1* | 12/2017 | Moyer | G06F 12/0897 |
| 2017/0357597 A1 | 12/2017 | Tune | |
| 2018/0095883 A1* | 4/2018 | Polishuk | G06F 12/126 |
| 2018/0203807 A1 | 7/2018 | Krueger | |
| 2019/0227948 A1* | 7/2019 | Zhang | G06N 20/00 |

OTHER PUBLICATIONS

PCT International Search Report and Written Opinion in International Appln. No. PCT/US2019/063414, dated Mar. 19, 2020, 12 pages.

TW Office Action in Taiwan Application No. 108143272, dated Sep. 2, 2020, 11 pages (with English translation).

* cited by examiner

WAY PARTITIONING FOR A SYSTEM-LEVEL CACHE

CROSS-REFERENCE TO RELATED APPLICATION

This application claims priority to U.S. Provisional Application No. 62/805,080, filed on Feb. 13, 2019. The disclosure of the prior application is considered part of and is incorporated by reference in the disclosure of this application.

BACKGROUND

This specification relates to systems having integrated circuit devices.

A system-level cache (SLC) is a device that caches data retrieved from memory or data to be stored to memory for multiple different hardware devices in a system. In other words, different cache lines of the SLC can store data belonging to different hardware devices.

Typically, the multiple different hardware devices are different components integrated into a system on a chip (SOC). In this specification, the devices that provide read requests and write requests through the SLC will be referred to as client devices.

Caches can be used to reduce power consumption by reducing usage of main memory. In other words, as long as client devices can access the data they need in the cache, the main memory as well as the path to the main memory can be placed in a low-power state.

Caches are commonly organized into multiple sets having multiple ways. The memory address of a request is used to identify a particular set to place the cache line, and if an existing cache line has to be replaced, a particular caching policy determines which of the ways within the set should be replaced. For example, a cache can implement a caching policy by which the least-recently used cache line within a set gets replaced first.

Some SLCs can be configured to implement a way-partitioning policy that assigns dedicated ways to different client devices of the system. The primary goal of such partitioning is to minimize cache thrashing and deliver predictable performance or energy savings for any client or group of clients sharing the SLC. Thus, for example, a caching policy can specify that requests from one or more client devices are always stored in four ways and that cache lines in those four ways cannot be allocated for any other client device(s).

SUMMARY

This specification describes techniques for implementing a way-partitioning policy in a system-level cache. The way-partitioning policy allows a system-level cache to allocate ways to cache partitions. In this specification, a partition of a system-level cache is a portion of cache resources that are allocated for caching requests to a particular region of memory. Thus, generally there is a direct correspondence between a cache partition and a particular region of memory, e.g., a memory buffer. One or more client devices that access the region of memory can therefore share, and possibly compete for, the cache resources allocated to the corresponding partition.

The way-partitioning policy described in this specification describes how a system-level cache can assign primary ways to a partition, which has the effect of dedicating physical cache resources to a particular memory buffer that is accessed by one or more client devices. The way-partitioning policy also allows a system-level cache to allocate secondary ways to a partition, which can increase the number of ways allocated to the partition. However, the secondary ways may also be shared with one or more other partitions. In other words, the secondary ways can be used to service memory requests from client devices for multiple different memory buffers, each corresponding to a different respective cache partition.

Particular embodiments of the subject matter described in this specification can be implemented so as to realize one or more of the following advantages. The way-partitioning policy described in this specification allows a system-level cache to improve the efficiency of the hardware device in which it is implemented. In particular, the caching performance can be tailored to suit different execution contexts, which reduces the amount of power-intensive and high-latency requests to memory. In other words, the system-level cache can implement partitions that dynamically change in size and adapt to changing use cases over time. This improves both the power efficiency of the device and makes the device itself faster by reducing trips to memory in all execution contexts. In addition, when a particular execution context can rely on the system-level cache alone instead of main memory, path to high-power memory devices can be powered down or turned off entirely, which further improves the power consumption of the device. The way-partitioning policy is also more flexible than other approaches because it allows for efficiently computing cache configurations without needing to preprogram every possible combination of client devices that may or may not be active in different execution contexts. Therefore, if new client devices or execution contexts are added, the preconfigured and prioritized configuration of the partitioning tables allows recomputation of the way assignments for any given client or group of clients. These techniques also reduce the latency of switching execution contexts, which makes the device itself more responsive to the changing use case. The actual addition or removal of clients and/or the execution contexts can be triggered through hardware or software methods. In addition, the partitioning policy enables maximizing the use of cache across all the potential execution contexts.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
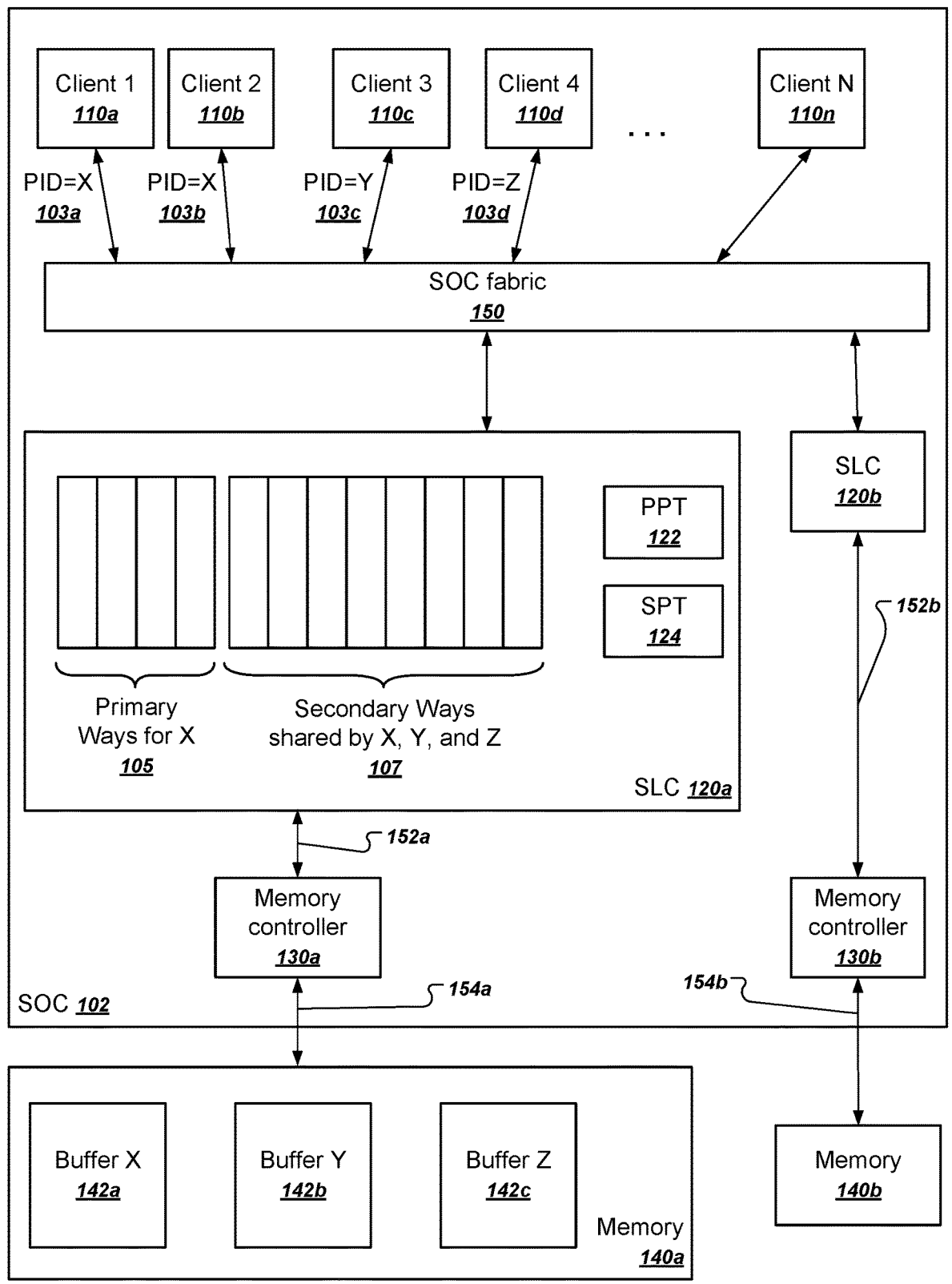
FIG. 1A is a diagram of an example system.

FIG. 1A is a diagram of an example system 100. The system 100 includes a system on a chip (SOC) 102 communicatively coupled to two memory devices 140a-b. The SOC 102 has two system-level caches (SLCs) 120a-b, one respective SLC dedicated to caching data for each of the memory devices 140a-b. However, in general, it is not required to have one SLC for each memory device. In addition, an SOC can have more than two SLCs.

The SOC 102 is an example of a device that can be installed on or integrated into any appropriate computing device, which may be referred to as a host device. Because the techniques described in this specification are suited to saving power consumption for the host device, the SOC 102 can be particularly beneficial when installed on a mobile host devices that rely on battery power, e.g., a smart phone, a smart watch or another wearable computing device, a tablet computer, or a laptop computer, to name just a few examples.

The SOC 102 has multiple client devices 110a-n. Each of the client devices 110a-n can be any appropriate module, device, or functional component that is configured to read and store data in one or more of the memory devices 140a-b through the SOC fabric 150. For example, a client device can be a CPU, an application-specific integrated circuit or lower-level components of the SOC itself that are each capable of initiating communications through the SOC fabric 150.

Requests from the client devices 110a-n can explicitly or implicitly identify a particular partition. Thus, requests 103a-b from the client devices 110a and 110b identify partition X corresponding to the buffer X 142a in the memory 140a. Therefore, multiple client devices can effectively share a cache partition when their memory requests identify the same partition identifier for a particular memory region. For example, the client 110a can be a GPU and the client 110b can be a display controller that both access the same display buffers in the memory 140a.

Other client devices can access other partitions by issuing requests having other partition identifiers. For example, requests 103c from the client device 110c identify partition Y that corresponds to the buffer Y 142b, and requests 103d from the client device 110d identify partition Z that corresponds to the buffer Z 142c in the memory 140a.

The SLC 120a is an example of a system-level cache that can implement a way-partitioning policy that allocates primary ways and secondary ways to partitions. In some implementations, each primary way is dedicated to a single partition, and each secondary way can be shared among a group of multiple partitions.

For example, as shown in FIG. 1A, the SLC 120a has allocated a number of primary ways 105 for partition X. The SLC 120a has also allocated a number of secondary ways 107 that are shared by partitions X, Y, and Z.

When the SLC 120a receives a request from a client device, the SLC 120 will use the partition identifier of the request to determine how to service the request. For example, when the partition identifier is X, the SLC 120a can use any of the primary ways 105 or any of the secondary ways 107 allocated to partition X. But when the partition identifier is Y, the SLC 120a will use only the secondary ways allocated to the partition Y, which are also shared by the partitions X and Z.

Allocating primary ways in this fashion prevents particular client devices from competing for cache resources. For example, when a single client device is accessing a particular partition having primary ways, the client device is assured that no other client device will replace its cache entries. On the other hand, because the secondary ways are shared by multiple partitions, the secondary ways can be replaced by client devices accessing different partitions. However, the secondary way partitioning can still act to limit the number of client devices for which this is true. For example, the secondary ways 107 can be replaced by client devices 110a-d, but not any of the other client devices on the SOC 102.

The SOC fabric 150 is a communications subsystem of the SOC 102. The SOC fabric 150 includes communications pathways that allow the client devices 110a-n to communicate with one another as well as to make requests to read and write data using the memory devices 140a-b. The SOC fabric 150 can include any appropriate combination of communications hardware, e.g., buses or dedicated interconnect circuitry.

The system 100 also includes communications pathways 152a-b that allow communication between the SLCs 120a-b and the memory controllers 130a-b as well as inter-chip communications pathways 154a-b that allow communication between the memory controllers 130a-b and the memory devices 140a-b. In some implementations, the SLCs 120a-b can save power by powering down one or more of these communications pathways 152a-b and 154a-b. Alternatively or in addition, in some implementations the SLCs 120a-b can power down the memory devices 140a-b themselves to further conserve power. As another example, the SOC 102 can enter a clock-shut-off mode in which respective clock circuits are powered down for one or more devices.

The SLCs 120a-b are positioned in the data pathway between the SOC fabric 150 and respective memory controllers 130a-b. The memory controllers 130a-b can handle requests to and from the memory devices 140a-b. Thus, requests from the client devices 110a-n to read from or write to the memory devices 140a-n pass through respective SLCs 120a-b. For example, the client 110a can make a request to read from the memory device 140a, which passes through the SOC fabric 150 to the SLC 120a. The SLC 120a can handle the request before forwarding the request to the memory controller 130 for the memory device 140a.

The SLCs 120a-b can cache read requests, write requests, or both from client devices 110a-n. The SLCs 120a-b can cache read requests from client devices by responding to the request with data stored in the cache data rather than fetching the data from the memory devices 140a-b. Similarly, the SLCs can cache write requests from client devices by writing the new data in the cache rather than writing the new data in the memory devices 140a-b. The SLC 120a-b can the perform a write-back at a later time to store the updated data in the memory devices 140a-b.

Each SLC 120a-b has dedicated cache memory, which can be implemented using dedicated registers or high-speed random access memory. Each SLC 120a-b can implement a caching policy that allocates ways of the cache memory according to a primary partitioning table (PPT) 122 and a secondary partitioning table (SPT) 124.

The PPT 122 and the SPT 124 control how the SLC 120a allocates cache resources to cache memory requests for different partitions accessed by the client devices 110a-n. In general, each SLCs 120a or 120b can allocate primary ways such that each primary way is dedicated to one memory buffer. The memory buffer itself may be accessed by one or more respective client devices. An SLC can allocate secondary ways such that each secondary way is optionally shared for requests within a group of multiple memory buffers. In other words, the secondary ways can result in one or more client devices sharing the same cache resources for requests two or more memory buffers.

Figure 1B:
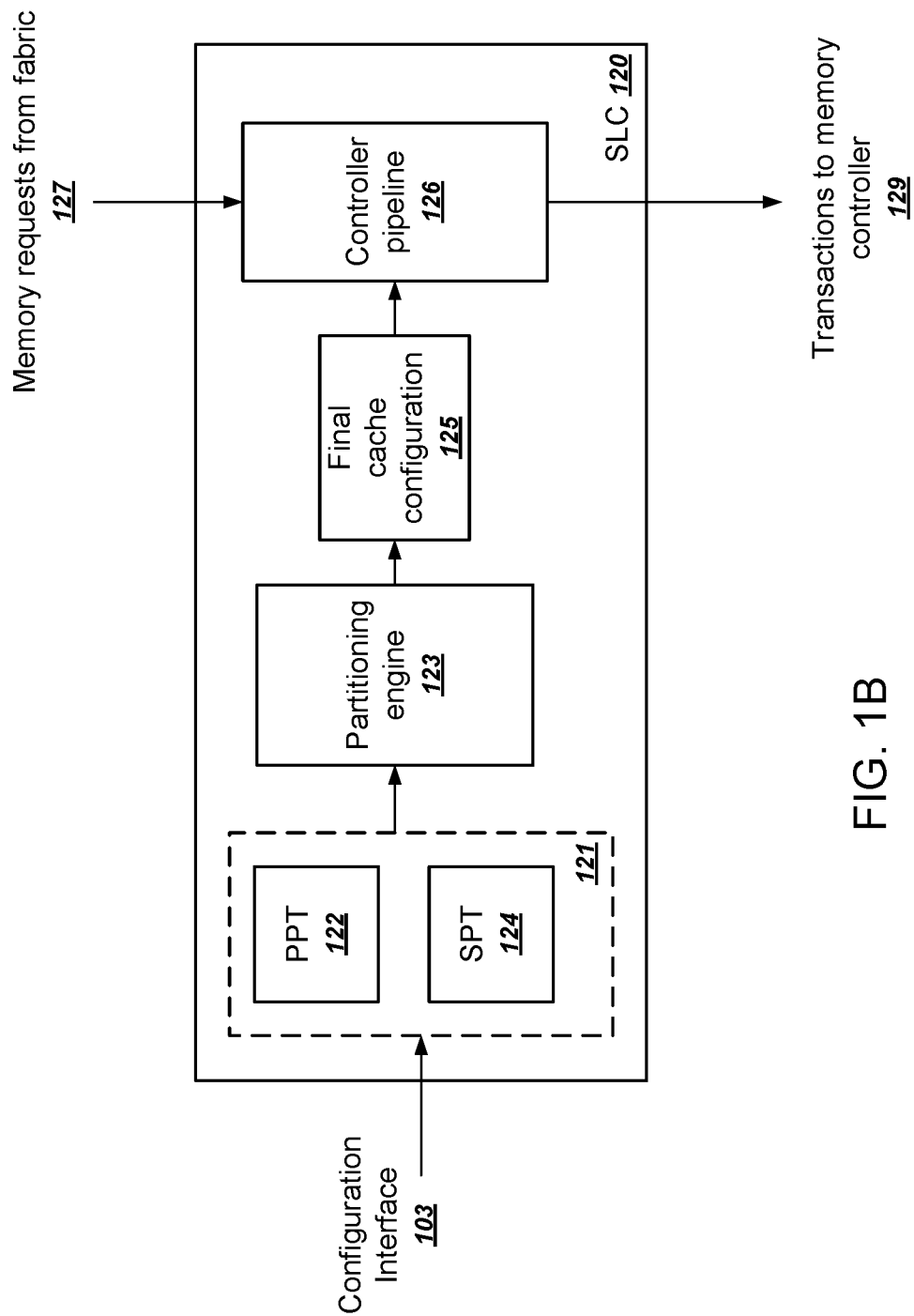
FIG. 1B illustrates components of an example system-level cache.

FIG. 1B illustrates components of an example system-level cache 120. An SLC implementation can have more or fewer components than those illustrated in FIG. 1B. For example, in addition to the illustrated components, and SLC can have other components that relate to managing RAMs, power, testing, or debugging, to name just a few examples.

The SLC 120 generally handles memory requests 127 from the SOC fabric using a controller pipeline 126. The controller pipeline 126 implements the cache logic for determining whether or not data exists in the cache or needs to be fetched from or written to memory. Thus, the controller pipeline also provides transactions 129 to a memory controller when access to memory is required.

As mentioned above, the SLC 120 includes a primary partitioning table 122 and a secondary partitioning table 124. These tables 121 can be updated using a software configuration interface 103, a hardware signaling interface, or both. In some implementations, control logic of the SLC 120 reconfigures the PPT 122 and the SPT 124 after the execution context of the SLC 120 changes. The SLC 120 can then reallocates ways to partitions based on the updated PPT 122 and updated SPT 124 using the techniques described below.

In this specification, an execution context represents a particular combination of memory buffers that client devices access through the SLC. Thus, a change in execution context from the perspective of an SLC is a change in how client devices use memory buffers. Thus, an execution context closely corresponds to which client devices on the SOC are active and which client devices on the SOC are idle in terms of requests to memory through the SLC. From the perspective of an SLC, a client device can be idle due to being inactive or powered down, but also because a client device is not exercising the SLC with its memory requests. For example, if a client device is actively powered on and executing but not exercising the cache, e.g., because it is not writing to memory or because it is writing directly to memory without exercising the SLC, the SLC can consider that client device to be idle.

Thus, the SOC can consider any change to how the client devices use the SLC to be a change in execution context. For example, if a mobile device transitions from an active power state to a sleep power state, the SOC can consider the execution context to have changed when the number of client devices using the SLC changes. As another example, the execution context can also change if the combination of components actively using the SLC changes. For example, if a user of a mobile device opens the camera app, one or more client devices of the SOC that are dedicated to image processing can transition from a sleep state to an active state. The new execution context will be triggered due to the image processing devices beginning to access memory buffers through the SLC. As another example, the execution context can also change when one or more client devices transition out of the active state and become idle in terms of requests to memory through the SLC.

The execution context can also change due to a system usage change. For example, if the user switches from using a word processor to playing a game, the system can consider this usage change to be a change in execution context because the memory buffers that get accessed through the SLC may change.

A change in execution context does not necessarily imply that there has been a change in which client devices are active or that there has been a change in power consumption. For example, if a user changes the image resolution when taking a video, the system can consider this change in system state to be a change in the execution context because the boundaries of the memory buffers accessed by the client devices changes. In other words, the change in resolution can affect how the client devices access the memory buffers due to the changed amounts of data being generated by the changed resolution.

A partitioning engine 123 is configured to perform the way-partitioning policies described below using the PPT 122 and the SPT 124. In some implementations, the partitioning engine 123 is configured to perform way partitioning upon detecting a new execution context.

The partitioning engine 123 can then generate a final cache configuration 125 that the controller pipeline 126 uses to service memory requests 127 from the SOC fabric. In particular, the final cache configuration 125 specifies which ways of the cache memory are allocated to which partitions so that the controller pipeline 126 can determine which ways to use when servicing the memory requests 127.

The partitioning engine 123 can perform the partitioning techniques described below using dedicated hardware circuitry of the SLC 120. Alternatively or in addition, the partitioning processes can be implemented in software and the partitioning engine 123 can cause a CPU of the host device to perform the processing algorithm. For example, when the execution context changes, the partitioning engine 123 can generate an interrupt that causes the CPU of the host device to perform the partitioning process and write the result in the final cache configuration 125.

Figure 2:
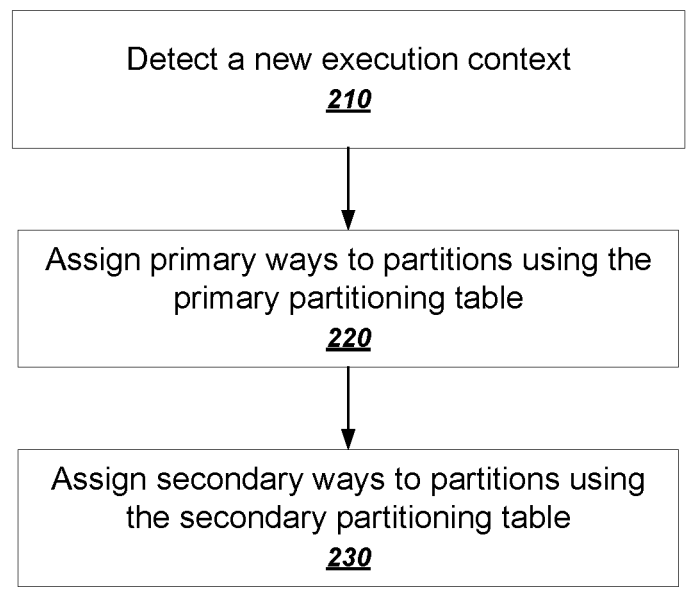
FIG. 2 is a flowchart of an example process for allocating ways of a system-level cache.

FIG. 2 is a flowchart of an example process for allocating ways of a system-level cache. The example process can be performed by one or more components of a system-level cache. The example process will be described as being performed by a partitioning engine of a system-level cache on an SOC, e.g., the partitioning engine 123 of FIG. 1B, programmed appropriately in accordance with this specification.

The partitioning engine detects a new execution context (210). As described above, a change in execution context represents a change in how client devices access memory buffers through the SLC.

The SLC can be configured to automatically generate a repartitioning trigger event when an execution context of the system changes. The repartitioning trigger event, or for brevity, the trigger event, is an signal or data received through the system that indicates that the cache partitions of the SLC need to be reallocated.

The partitioning engine assigns primary ways to partitions using the primary partitioning table (220). The primary partitioning table can include a "partition enabled" attribute that indicates, for a particular execution context, which partitions are active and which are idle. The SOC can be configured to automatically update this information in the primary partitioning table whenever the execution context changes. In some implementations, software drivers of respective client devices can modify the data in the partition enabled attribute to indicate whether or not the partition accessed by the client devices be enabled or disabled.

In some other implementations, the SLC can monitor traffic to determine which partitions should be enabled or disabled. For example, the SLC can be configured to enable a partition when it receives a read or write request for the partition or more than a threshold number of read or write requests for the partition. Conversely, the SLC can be configured to disable a partition when more than a threshold amount of time has elapsed since receiving a read or write request for the partition.

As mentioned above, assigning primary ways to partitions means that the ways are exclusively assigned to a cache partition. An example process for assigning primary ways to partitions is described below with reference to FIG. 3.

The partitioning engine also assigns secondary ways to partitions using the secondary partitioning table (230). As mentioned above, assigning secondary ways to partitions means that some ways may be shared by multiple partitions. An example process for assigning ways to secondary partitions is described below with reference to FIG. 4.

After assigning ways to partitions, the SLC can begin servicing memory requests for client devices on the SOC. In doing so, when receiving memory requests from a particular client device that identifies a partition explicitly or implicitly, the SLC will allocate one or more cache lines for the request in the ways assigned to the identified partition.

Figure 3:
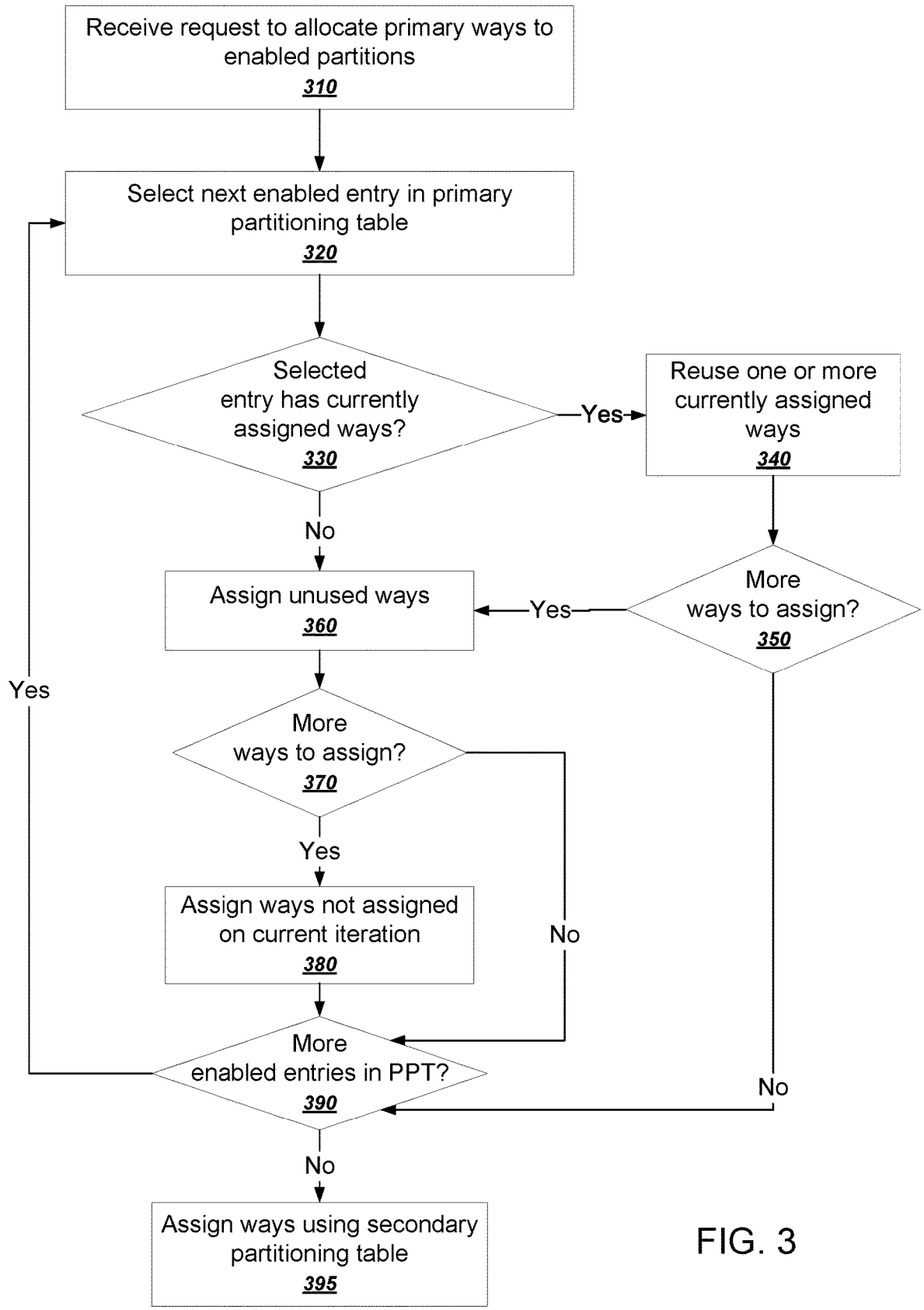
FIG. 3 is a flowchart of an example process for assigning primary ways to partitions.

FIG. 3 is a flowchart of an example process for assigning primary ways to partitions. The example process can be performed by one or more components of a system-level cache. The example process will be described as being performed by a partitioning engine of a system-level cache on an SOC, e.g., the partitioning engine 123 of FIG. 1B, programmed appropriately in accordance with this specification.

The partitioning engine receives a request to allocate primary ways to enabled partitions (310). As described above, the request can coincide with a detected change in execution context.

The data in the primary partitioning table indicates which partitions are enabled or disabled for the execution context as well as how many ways each partition requests.

TABLE 1 illustrates an example primary partitioning table.

TABLE 1

| Partition Enabled | Partition ID | Priority | Primary Way Count |
|---|---|---|---|
| 1 | 0 | 5 | 6 |
| 0 | 1 | 2 | 4 |
| 1 | 2 | 7 | 10 |
| 0 | 3 | 1 | 2 |

The primary partitioning table has four tuples corresponding to the rows of TABLE 1. Each tuple has four attributes corresponding to the columns of TABLE 1. The tuples of the primary partitioning table can be stored in any appropriate manner on the SOC. For clarity, the remainder of the specification will refer to each tuple as a row and each attribute as a column. However, the tuples of the primary partitioning table need not be stored on the SOC contiguously or in tabular form.

Each row of TABLE 1 corresponds to a particular partition using the SLC. Thus, each row contains data representing four attributes of a particular partition.

The "partition enabled" attribute represents whether or not the partition is active or idle in the current execution context.

The "partition ID" attribute is a unique identifier that distinguishes one partition from the other partitions on the SOC.

The "priority" attribute is a numeric value that assigns relative levels of priority to the partitions.

The "primary way count" attribute is a numeric value that represents a number of ways that are requested by individual partitions. For example, TABLE 1 indicates that a partition having a partition id of 2 requests allocation of 10 primary ways for its partition.

The primary partitioning table can be implemented on the SOC as a look-up table that returns tuple values of the primary partitioning table for a given execution context. For a particular execution context, all attributes but "partition id" can change. In some implementations, the primary way counts are configured once at manufacturing time or once at startup and then never changed. For example, the different values of the tuples in the primary partitioning table for each execution context can be preprogrammed by a manufacturer of the SOC either before or after the SOC is manufactured. The programmed values of the primary partitioning table can represent the results of power management and performance optimizations for various execution contexts of a device that the SOC is designed to be installed within. In some other implementations, the primary way counts can be changed dynamically. The way-partitioning processes described in this specification can be used to allocate ways for any of these alternative implementations.

As illustrative example, partition id 3 may correspond to a buffer for a special-purpose image processor that is configured to perform image-enhancement algorithms on captured photos. In a sleep state when no photos are anticipated to be taken, the partition id 3 may have the values shown in TABLE 1, e.g., values that indicate that the partition is disabled, that the priority is relatively low when the partition is enabled and that the requested ways are smaller than any other partitions.

However, if the camera application of a mobile device is started begins accessing a memory buffer through the SLC, the execution context changes, and the SOC can use the look-up table to repopulate the values in the primary partitioning table. In the execution context corresponding to active use of the camera application, the partition id 3 may have values indicating that the partition is in use, may be marked high priority, and has many requested ways, e.g., 10, 20, or 50 ways.

The partitioning engine selects a next enabled entry in the primary partitioning table (320). The partitioning engine can process the tuples in the primary partitioning table in any appropriate order. In some implementations, the partitioning engine processes tuples in the primary partitioning table in an order specified by the priority attribute. Therefore, from TABLE 1, a partitioning engine could process the tuples in the following device id order: 2, 0, 1, 3.

In addition, the order itself can be tuned to achieve an optimal performance or energy profile across all execution contexts. For example, the priority order could be optimized based on application specific requirements of the system. As another example, the entries can be prioritized according to a measure of energy savings, according to performance benefits, or in an order that prioritizes satisfying functional requirements first.

Some client devices may not be able to operate effectively in the face of a shrinking partition size. Thus, in some implementations, the SLC can support a shrink-lock flag that prevents the partition size for a particular client device from shrinking after a change in execution context in which the partition is still enabled. This option effectively overrides the priority attribute in the primary partitioning table by forcing the partitioning algorithm to start the process by allocating ways for partitions having the shrink-lock flag enabled.

The partitioning engine determines whether the selected entry has currently assigned ways (330). The SLC can improve caching performance on an execution context switch by maintaining as much data as possible in the cache. For example, if a particular partition is enabled both before and after the context switch, it is typically more power efficient and provides better performance to maintain the particular partition's ways to the extent possible.

Thus, if the selected entry has currently assigned ways, the partitioning engine reuses one or more currently assigned ways (340). To do so, the partitioning engine can prioritize assigning currently assigned ways to satisfy the requested ways in the primary partitioning table. If there are fewer requested ways than currently assigned ways, the partitioning engine can satisfy the requested ways in the primary partitioning table using only the currently assigned ways. However, if there are an insufficient number of currently assigned ways, the partitioning engine can continue to assign ways to the primary partition.

Thus, the partitioning engine can determine whether there are more ways to assign to the primary partition (350). In other words, the partitioning engine determines whether the requested ways in the primary partitioning table have been satisfied.

If there are no more ways to assign to the current partition, the partitioning engine can iterate to the next enabled entry in the primary partitioning table by determining if there are more enabled entries in the primary partitioning table to be processed (branch to 390).

If there are more ways to assign to the current partition (350), the partitioning engine assigns unused ways to the partition for the selected entry (branch to 360). Unused ways are ways in the system-level cache that are part of the cache hardware but which have not been recently used. In some implementations, the partitioning engine can determine one or more ways that have not been used for at least a threshold period of time, e.g., 5, 500, or 5000 milliseconds. In other implementations, unused ways could be the outcome of prior iterations of the partitioning engine.

The partitioning engine can then determine whether there are more ways to assign to the current partition (370). If there are no more ways to assign to the current partition, the partitioning engine can iterate to the next entry in the primary partitioning table by determining if there are more enabled entries in the primary partitioning table (branch to 390).

If there are more ways to assign to the current partition (370), the partitioning engine assigns ways not assigned on the current iteration to the partition for the selected entry (branch to 380). Unassigned ways are ways in the system-level cache that are not currently assigned to any partition. In other words, these ways have not been taken up in the current iteration of the partitioning engine.

Client devices can also make use of special configuration options.

For example, client devices can make use of a "full-partition-only" flag. The full-partition-only flag indicates that a particular client device cannot effectively utilize the SLC unless its partition has access to all of its requested primary ways. Since these clients cannot effectively deal with unknown partition sizes, the system can consider their secondary way counts to be zero or set the secondary way counts to zero when the full-partition-only flag is enabled.

Therefore, in implementations that support the full-partition-only flag, if by step 380 the partition has not been assigned at least as many ways as the primary way count for the partition, the system can abort allocation for the partition and roll back any ways allocated to the partition.

In addition, the SLC can also support a partial-allocation-override flag that signals to client devices the fact that fewer ways were allocated to the partition than what was requested by the primary way count in the primary partitioning table. For partitions having the partial-allocation-override flag enabled, when the SLC does not allocate all requested ways, the SLC can send a signal to the client devices indicating that fewer than the requested ways were allocated to the partition.

In order to ensure that the client devices use this information appropriately, the SLC can also alter the final cache configuration so that no cache lines are allocated for the client device until the client device acknowledges the partial allocation by sending a partial-allocation acknowledgement back to the SLC. This can mean, for example, that the client device has changed its internal configuration, e.g., by reducing its buffer size, to account for the partial allocation. Upon receiving the partial allocation acknowledgement, the SLC can re-enable allocations in the final cache configuration so that the client device can begin using the partial allocation after changing its internal configuration.

If there are more enabled entries in the primary partitioning table (390), the partitioning engine selects the next enabled entry in the primary partitioning table (branch to 320).

If at any time all the ways of the cache hardware end up being assigned in the current iteration, the partitioning engine is out of resources to assign and can therefore exit the process of way assignment.

If unassigned ways are still available at the end of processing the primary partition table, the partitioning engine proceeds to assign ways using the secondary partitioning table (branch to 395). This process is described in more detail below with reference to FIG. 4.

Figure 4:
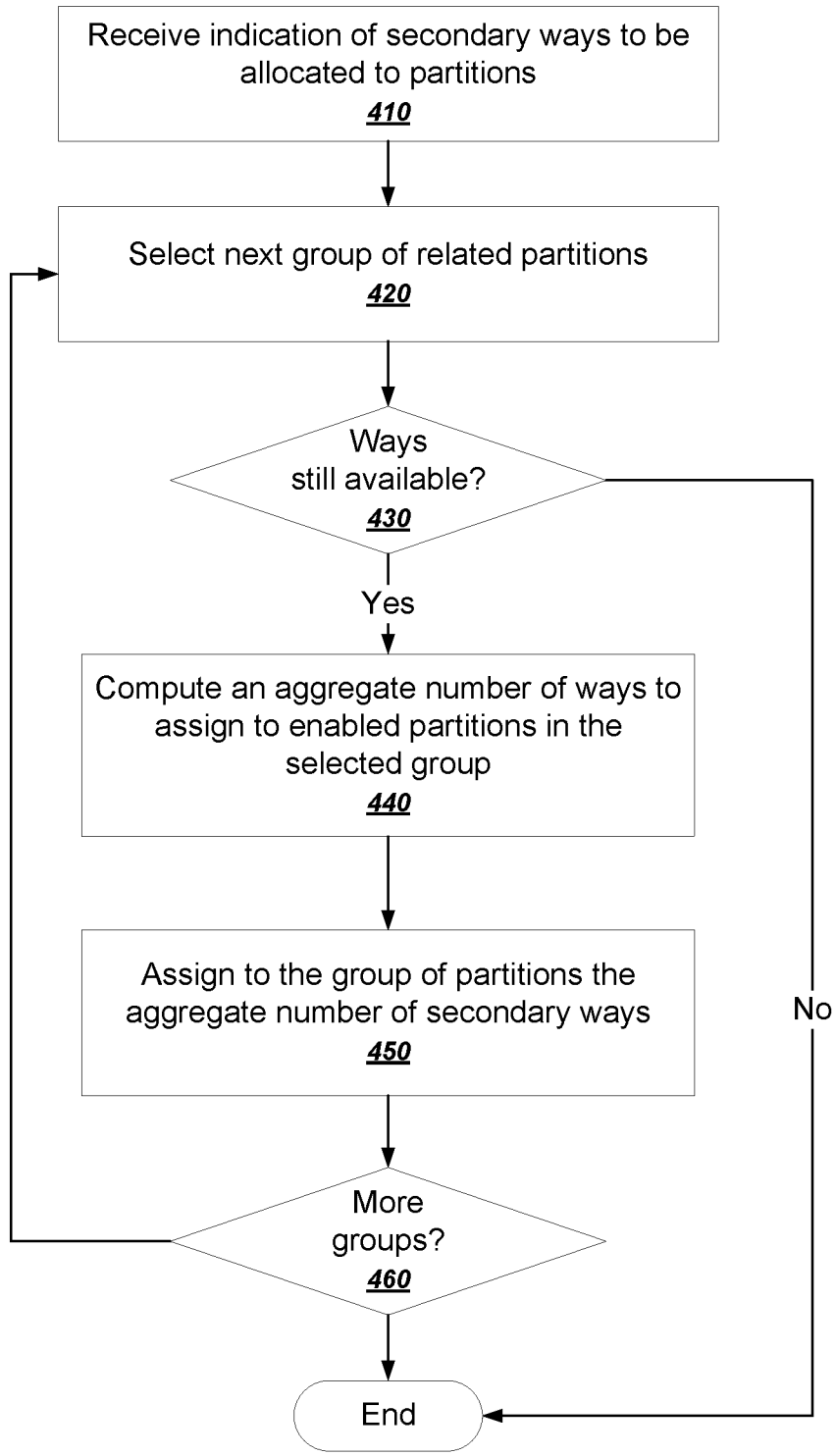
FIG. 4 is a flowchart of an example process for assigning secondary ways to partitions.

FIG. 4 is a flowchart of an example process for assigning secondary ways to partitions. The example process can be performed by one or more components of a system-level cache. The example process will be described as being performed by a partitioning engine of a system-level cache on an SOC, e.g., the partitioning engine 123 of FIG. 1B, programmed appropriately in accordance with this specification.

The partitioning engine receives an indication of secondary ways to be allocated to partitions (410). As described above, if there are still unassigned ways after the SLC assigns primary ways, the partitioning engine can assign secondary ways according to a secondary partitioning table.

TABLE 2 illustrates an example secondary partitioning table.

TABLE 2

| Partition ID | Group ID | Secondary Way Count |
| --- | --- | --- |
| 0 | 0 | 2 |
| 1 | 1 | 2 |
| 2 | 0 | 6 |

The example secondary partitioning table in TABLE 2 has three tuples corresponding to three of the partitions that were represented in the example primary partitioning table above. In other words, all partitions need not be represented in the secondary partitioning table. However, in some implementations, partitions do not appear in the secondary partitioning table unless they also appear in the primary partitioning table. This means that the secondary partitioning table can act as an overflow table for partitions that cannot acquire enough primary ways through the primary partitioning table. It may also be a system level trade-off to request a minimum needed number of primary ways in the primary partition table and then request maximum usable number of secondary ways in the secondary partitioning table. As is evident, there are many ways that this flexible approach can be used to take advantage of the phased processing of the way assignment.

Each row of TABLE 2 corresponds to a particular partition using the system level cache. The "partition ID" attribute uniquely identifies a partition for a particular tuple.

The "group id" attribute specifies to which group a particular partition belongs. As mentioned above, partitions in the same group will share the secondary ways of the cache assigned during the secondary partitioning process, and the group id defines which partitions are in the same group.

The "secondary way count" attribute is a numeric value that represents a number of secondary ways that are requested by each individual partition. For example, TABLE 2 indicates that a partition having a partition id of 2 requests allocation of 6 secondary ways for its partition. Note that partitions in the same group need not have matching secondary way counts.

Like the primary partitioning table, an SLC can populate the secondary partitioning table when the execution context for the SOC changes. Alternatively, the values for the secondary partitioning table can be preprogrammed by the SOC manufacturer either before or after the SOC is manufactured.

The partitioning engine selects a next group of related partitions (420). The partitioning engine can iterate through the group ids in the secondary partitioning table in any appropriate order. In some implementations, each group is associated with a respective secondary level of priority, and the partitioning engine iterates through the groups according to the respective secondary levels of priority. Similar to the priorities used in processing the primary partitioning table, the priority in the secondary partitioning table can be used by system architects to tune the way assignment strategy in order to improve performance or minimize energy consumption.

The partitioning engine determines whether any ways are still available to be allocated (430). If not, the process ends (branch to end). For example, the partitioning engine can decline to continuing iterating through groups when all the available ways have been allocated. Moreover, the partitioning engine may not allocate secondary ways to partitions at all, e.g., if the primary partitioning process allocated all available ways.

If some ways are still available to be assigned (430), the partitioning engine computes an aggregate number of ways to assign to the enabled partitions in the selected group (branch to 440). The partitioning engine can use the respective secondary way counts to compute a single, aggregate number of secondary ways to enabled partitions in the selected group.

The partitioning engine can compute the aggregate number of ways in a variety of ways. For example, the partitioning engine can compute a sum, a minimum, a maximum, a mode, or another measure of central tendency for secondary way counts in the group. The system can cap the aggregate number of ways according to how many ways are still available to be assigned. For example, if the aggregate number of ways was 14 but only 10 ways remain to be assigned, the system can cap the aggregate number of ways at 10 ways.

The partitioning engine assigns to the group of partitions the aggregate number of secondary ways (450). The effect of such assignment during operation is that any requests from any of the one or more partitions in the group can be placed among the allocated secondary ways belonging to the group. Thus, the client devices owning the partitions in the group share secondary ways when using the corresponding memory buffers.

The partitioning engine determines if there are more groups in the secondary partitioning table to be processed (460). If so, the partitioning engine selects a next group of related partitions (branch to 420). If not, the process ends (branch to end).

At the end of the primary way-partitioning process (FIG. 3), or at the end of the secondary way-partitioning process (FIG. 4), if there are still unallocated ways, the system can individually power down those ways in order to further save power and extend battery life on the host device.

Figure 5:
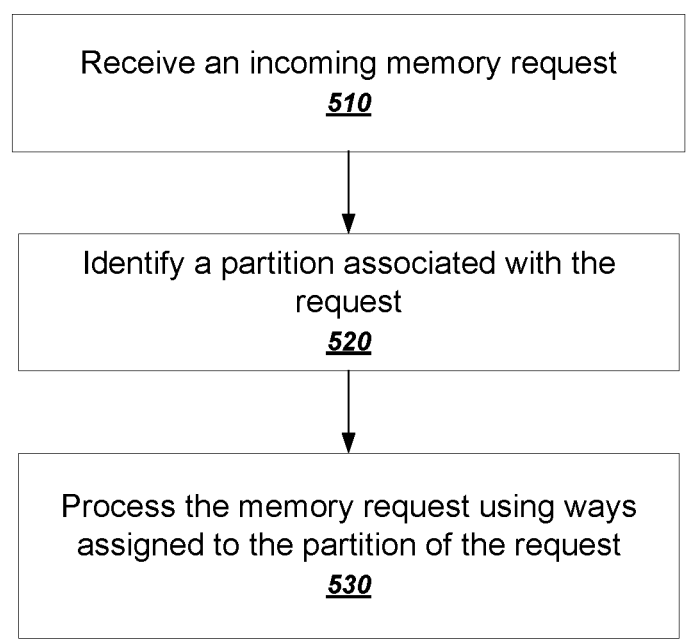
FIG. 5 is a flowchart of an example process for processing memory requests by a system-level cache.

FIG. 5 is a flowchart of an example process for processing memory requests by a system-level cache. The example process can be performed by one or more components of a system-level cache. The example process will be described as being performed by a controller pipeline of a system-level cache on an SOC, e.g., the controller pipeline 126 of FIG. 1B, programmed appropriately in accordance with this specification.

The controller pipeline receives an incoming memory request (510). As described above, the controller pipeline is positioned in the data pathway between client devices and the memory controller for the incoming memory request. The controller pipeline can process all memory requests to the memory controller.

The controller pipeline identifies the partition associated with any given request (520). Each memory request can be encoded explicitly or implicitly with an identifier that distinguishes the partitions used by one or more of the client devices. For example, each memory request can be explicitly tagged with a partition id. Alternatively or in addition, the SLC can maintain a mapping that associates each client device in each particular execution context with a corresponding partition id.

The controller pipeline processes the memory request using ways assigned to the partition of the request (530). The controller pipeline can effectuate the request using the cached memory, forward the request to the memory controller, or both.

In doing so, the controller pipeline can consider a primary ways allocated to the partition associated with the request as well as a secondary ways allocated to a group of partitions that includes the partition of interest.

The controller can further optimize how allocations and replacements are done by factoring in the properties of primary and secondary ways in a partition. For example, the controller pipeline can prioritize replacement of the secondary ways over the primary ways because cache entries in the primary ways cannot be replaced by other requests belonging to other partitions.

In some implementations, on a read cache miss or a write cache miss, the controller uses the following order of priority to identify a replacement cache line:
1. If the corresponding partition has no assigned ways, do not allocate a cache line.
2. Use an invalid secondary way for the partition if available.
3. Use an invalid primary way for the partition if available.
4. Replace a least-recently used cache line among the total assigned ways for the partition.

Alternatively, the controller can treat all the ways assigned to a partition as the same and implement any traditional allocation and replacement policy within those ways.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a hardware-implemented or software implemented input/output system that provides an output that is different from the input. An engine can be implemented in dedicated digital circuitry or as computer-readable instructions to be executed by a computing device. Each engine can be implemented within any appropriate type of computing device, e.g., servers, mobile phones, tablet computers, notebook computers, music players, e-book readers, laptop or desktop computers, PDAs, smart phones, or other stationary or portable devices, that includes one or more processing modules and computer-readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a host device having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a system comprising:
multiple integrated client devices;
a memory controller configured to read data from a memory device; and
a system-level cache configured to cache data requests through the memory controller for each of the multiple integrated client devices,
wherein the system-level cache comprises a cache memory having multiple ways, each way of the multiple ways being a primary way or a secondary way,
wherein each primary way is dedicated to a single respective partition corresponding to a memory buffer accessed by one or more client devices, and
wherein each secondary way is shared by a group of multiple partitions corresponding to multiple memory buffers accessed by a group of client devices, and wherein the system-level cache is configured to maintain a mapping between partitions and priority levels and is configured to allocate primary ways to respective enabled partitions in an order corresponding to the respective priority levels assigned to the enabled partitions.

Embodiment 2 is the system of embodiment 1, wherein the system-level cache is configured to exclusively allocate primary ways to a first partition accessed by one or more first client devices, and is configured to allocate secondary ways to the first partition and to one or more other partitions that are accessed by a group of client devices that also includes the first client device.

Embodiment 3 is the system of embodiment 2, wherein the system-level cache is configured to maintain a mapping between groups of client devices and secondary priority levels and is configured to allocate secondary ways to respective enabled partitions in an order corresponding to the respective secondary priority levels assigned to the groups of client devices.

Embodiment 4 is the system of embodiment 2, wherein the system-level cache is configured to allocate secondary ways only for partitions that each have already been allocated respective primary ways.

Embodiment 5 is the system of any one of embodiments 1-4, wherein the system-level cache is configured to allocate the primary ways according to a primary partitioning table having multiple entries that each represent a respective partition corresponding to a memory buffer used by one or more respective client devices, wherein each entry includes the respective requested number of primary ways for the corresponding partition.

Embodiment 6 is the system of embodiment 5, wherein the system-level cache is configured to allocate the primary ways by performing operations comprising:
iterating over enabled entries in the primary partitioning table, wherein each enabled entry represents a partition that uses the system-level cache for a particular execution context, and
for each enabled entry, allocating a number of primary ways to a respective partition corresponding to the enabled entry.

Embodiment 7 is the system of embodiment 6, wherein allocating a number of primary ways to a respective partition corresponding to the enabled entry comprises:
reusing one or more ways that are currently assigned to the partition;
assigning one or more unassigned ways that are not assigned to any partition; and
assigning one or more unused ways that are currently assigned to a different partition.

Embodiment 8 is the system of embodiment 6, wherein iterating over the enabled entries in the primary partitioning table comprises iterating over the enabled entries in an order determined by a level of priority assigned to each of the client devices.

Embodiment 9 is the system of embodiment 5, wherein the system-level cache is configured to allocate the secondary ways by performing operations comprising:
determining a group of related partitions;
computing an aggregate number of ways to assign to the group of related partitions according to requested secondary way counts in a secondary partitioning table of the system-level cache; and
assigning to the group of related partitions the aggregate number of ways computed for the related partitions in the group.

Embodiment 10 is the system of embodiment 9, wherein computing the aggregate number of ways to assign to the group of related partitions according to the requested secondary way counts comprises computing a max, a min, or a measure of central tendency of the secondary way counts in the secondary partitioning table for partitions in the group.

Embodiment 11 is the system of embodiment 9, wherein the system-level cache is configured to allocate respective secondary ways to respective groups of partitions such that there is no overlap between groups of partitions.

Embodiment 12 is the system of embodiment 9, wherein the secondary ways are assigned if and only if unassigned ways remain after processing the primary partitioning table.

Embodiment 13 is the system of embodiment 5, wherein the system-level cache is configured to reallocate primary ways, secondary ways, or both upon detecting a triggering event.

Embodiment 14 is the system of embodiment 13, wherein each triggering event changes enabled entries in the primary partitioning table for a different execution context.

Embodiment 15 is the system of any one of embodiments 1-14, wherein the system is configured to adjust a power state of the system depending on the allocation of ways to partitions.

Embodiment 16 is a method comprising the operations performed by the system of any one of embodiments 1-15.

Embodiment 17 is a mobile computing device comprising the system of any one of embodiments 1-15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   multiple integrated client devices;
   a memory controller configured to read data from a memory device; and
   a system-level cache configured to cache data requests through the memory controller for each of the multiple integrated client devices,
   wherein the system-level cache comprises a cache memory having multiple ways, each way of the multiple ways being a primary way or a secondary way,
   wherein each primary way is dedicated to a single respective partition corresponding to a memory buffer accessed by one or more client devices, and
   wherein each secondary way is shared by a group of multiple partitions corresponding to multiple memory buffers accessed by a group of client devices, and
   wherein the system-level cache is configured to maintain a mapping between partitions and priority levels and is configured to allocate primary ways to respective enabled partitions in an order corresponding to the respective priority levels assigned to the enabled partitions.

2. The system of claim 1, wherein the system-level cache is configured to exclusively allocate primary ways to a first partition accessed by one or more first client devices, and is configured to allocate secondary ways to the first partition and to one or more other partitions that are accessed by a group of client devices that also includes the first client device.

3. The system of claim 2, wherein the system-level cache is configured to maintain a mapping between groups of client devices and secondary priority levels and is configured to allocate secondary ways to respective enabled partitions in an order corresponding to the respective secondary priority levels assigned to the groups of client devices.

4. The system of claim 2, wherein the system-level cache is configured to allocate secondary ways only for partitions that each have already been allocated respective primary ways.

5. The system of claim 1, wherein the system-level cache is configured to allocate the primary ways according to a primary partitioning table having multiple entries that each represent a respective partition corresponding to a memory buffer used by one or more respective client devices, wherein each entry includes the respective requested number of primary ways for the corresponding partition.

6. The system of claim 5, wherein the system-level cache is configured to allocate the primary ways by performing operations comprising:
   iterating over enabled entries in the primary partitioning table, wherein each enabled entry represents a partition that uses the system-level cache for a particular execution context, and
   for each enabled entry, allocating a number of primary ways to a respective partition corresponding to the enabled entry.

7. The system of claim 6, wherein allocating a number of primary ways to a respective partition corresponding to the enabled entry comprises:
   reusing one or more ways that are currently assigned to the partition;
   assigning one or more unassigned ways that are not assigned to any partition; and
   assigning one or more unused ways that are currently assigned to a different partition.

8. The system of claim 6, wherein iterating over the enabled entries in the primary partitioning table comprises iterating over the enabled entries in an order determined by a level of priority assigned to each of the client devices.

9. The system of claim 5, wherein the system-level cache is configured to allocate the secondary ways by performing operations comprising:
   determining a group of related partitions;
   computing an aggregate number of ways to assign to the group of related partitions according to requested secondary way counts in a secondary partitioning table of the system-level cache; and
   assigning to the group of related partitions the aggregate number of ways computed for the related partitions in the group.

10. The system of claim 9, wherein computing the aggregate number of ways to assign to the group of related partitions according to the requested secondary way counts comprises computing a max, a min, or a measure of central tendency of the secondary way counts in the secondary partitioning table for partitions in the group.

11. The system of claim 9, wherein the system-level cache is configured to allocate respective secondary ways to respective groups of partitions such that there is no overlap between groups of partitions.

12. The system of claim 9, wherein the secondary ways are assigned if and only if unassigned ways remain after processing the primary partitioning table.

13. The system of claim 5, wherein the system-level cache is configured to reallocate primary ways, secondary ways, or both upon detecting a triggering event.

14. The system of claim 13, wherein each triggering event changes enabled entries in the primary partitioning table for a different execution context.

15. The system of claim 1, wherein the system is configured to adjust a power state of the system depending on the allocation of ways to partitions.

16. A method performed by a system comprising:
   multiple integrated client devices;
   a memory controller configured to read data from a memory device; and a system-level cache configured to cache data requests through the memory controller for each of the multiple integrated client devices, wherein the system-level cache comprises a cache memory having multiple ways, each way of the multiple ways being a primary way or a secondary way, wherein each primary way is dedicated to a single respective partition corresponding to a memory buffer accessed by one or more client devices, and wherein each secondary way is shared by a group of multiple partitions corresponding to multiple memory buffers accessed by a group of client devices, and wherein the method comprises:

maintaining a mapping between partitions and priority levels; and allocating primary ways to respective enabled partitions in an order corresponding to the respective priority levels assigned to the enabled partitions.

17. The method of claim 16, further comprising:
exclusively allocating primary ways to a first partition accessed by one or more first client devices; and
allocating secondary ways to the first partition and to one or more other partitions that are accessed by a group of client devices that also includes the first client device.

18. The method of claim 17, further comprising:
maintaining a mapping between groups of client devices and secondary priority levels; and
allocating secondary ways to respective enabled partitions in an order corresponding to the respective secondary priority levels assigned to the groups of client devices.

19. The method of claim 17, further comprising:
allocating secondary ways only for partitions that each have already been allocated respective primary ways.

20. The method of claim 16, further comprising:
allocating the primary ways according to a primary partitioning table having multiple entries that each represent a respective partition corresponding to a memory buffer used by one or more respective client devices, wherein each entry includes the respective requested number of primary ways for the corresponding partition.

21. The method of claim 20, further comprising allocating the primary ways by performing operations comprising:
iterating over enabled entries in the primary partitioning table, wherein each enabled entry represents a partition that uses the system-level cache for a particular execution context; and
for each enabled entry, allocating a number of primary ways to a respective partition corresponding to the enabled entry.

22. The method of claim 21, wherein allocating a number of primary ways to a respective partition corresponding to the enabled entry comprises:
reusing one or more ways that are currently assigned to the partition;
assigning one or more unassigned ways that are not assigned to any partition; and
assigning one or more unused ways that are currently assigned to a different partition.

23. The method of claim 21, wherein iterating over the enabled entries in the primary partitioning table comprises iterating over the enabled entries in an order determined by a level of priority assigned to each of the client devices.

24. The method of claim 20, further comprising allocating the secondary ways by performing operations comprising:
determining a group of related partitions;
computing an aggregate number of ways to assign to the group of related partitions according to requested secondary way counts in a secondary partitioning table of the system-level cache; and
assigning to the group of related partitions the aggregate number of ways computed for the related partitions in the group.

\* \* \* \* \*